Figure 1:
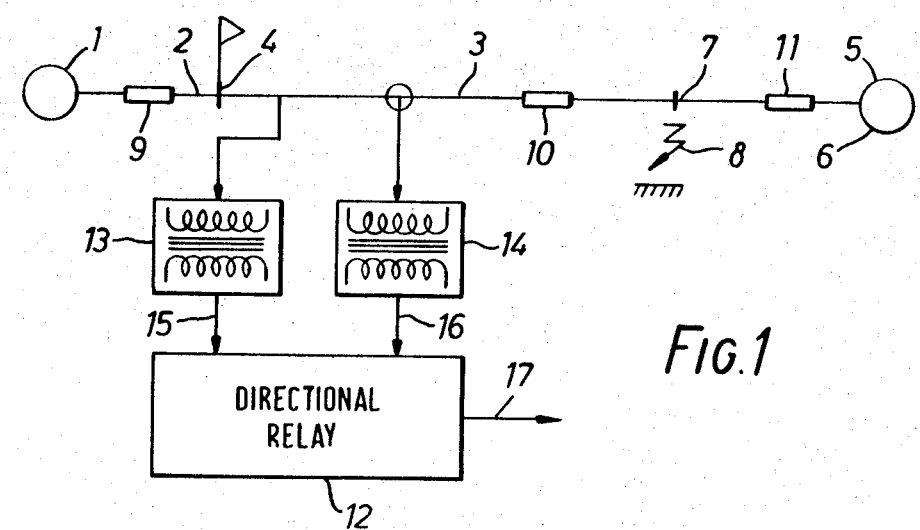

United States Patent [19]

Souillard

[11] 4,251,766
[45] Feb. 17, 1981

[54] METHOD AND APPARATUS FOR DETERMINING THE DIRECTION OF A FAULT ON A POWER TRANSMISSION LINE

[75] Inventor: Michel Souillard, Fontenay aux Roses, France

[73] Assignee: Enertec, Montrouge, France

[21] Appl. No.: 876,110

[22] Filed: Feb. 8, 1978

[30] Foreign Application Priority Data

Feb. 9, 1977 [FR] France ............................ 77 03569

[51] Int. Cl.³ .................. G01R 31/08; H02H 3/26
[52] U.S. Cl. .................................... 324/52; 361/80
[58] Field of Search .................. 324/51, 52; 361/80, 361/81, 84, 82

[56] References Cited

U.S. PATENT DOCUMENTS

| | | | |
|---|---|---|---|
| 3,281,673 | 10/1966 | Richardson | 324/52 |
| 3,474,333 | 10/1969 | Hoel | 324/52 |
| 3,723,864 | 3/1973 | Ricard | 324/52 |
| 3,800,215 | 3/1974 | Souillard | 324/52 |
| 3,931,502 | 1/1976 | Kohlas | 324/52 X |
| 4,063,300 | 12/1977 | Paddison et al. | 361/84 X |
| 4,110,684 | 8/1978 | Gale | 324/52 |

FOREIGN PATENT DOCUMENTS

| | | |
|---|---|---|
| 2228328 | 12/1973 | Fed. Rep. of Germany . |
| 201620 | 5/1970 | France . |
| 2291632 | 6/1976 | France . |
| 1232641 | 5/1971 | United Kingdom . |

*Primary Examiner*—Gerard R. Strecker
*Attorney, Agent, or Firm*—Mikio Ishimaru; Joseph J. Kaliko; Dale V. Gaudier

[57] ABSTRACT

Directional relay and method for monitoring at least one A.C. power transmission line to determine the position of a fault on the line with respect to a measurement location thereon.

According to a representative embodiment characteristic parameters, typically the respective phases, of a first signal representing the difference of complex voltages after and before the occurrence of the fault and of a second signal representing the line current after the occurrence of the fault, are compared, the result of the comparison providing the desired indication.

40 Claims, 7 Drawing Figures

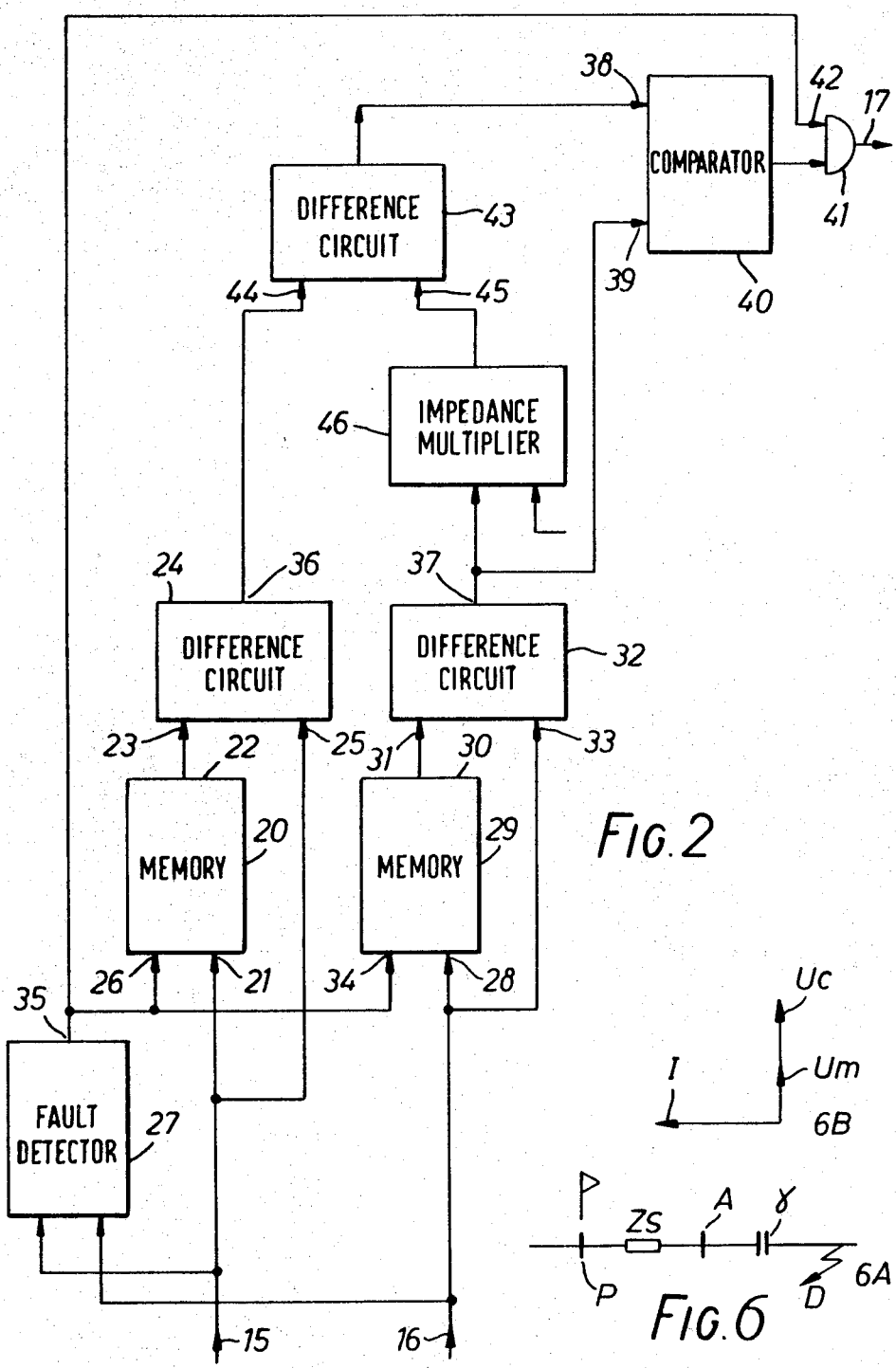

METHOD AND APPARATUS FOR DETERMINING THE DIRECTION OF A FAULT ON A POWER TRANSMISSION LINE

The present invention concerns a directional relay such as those encountered in systems for monitoring power transmission lines, particularly over long distances.

First of all, it is necessary to remember that a power transmission line must not be taken by itself, but within the whole of a complex network of lines. So, when a fault appears on a line, the disturbances, which are generated by this fault, can be passed along the network with greater or lesser effect.

Special precautions must be taken in order to be able to monitor a line in a network correctly. To begin with, all the lines are monitored by devices known as "fault detectors" which, when a fault appears on the network, provide a signal at their output. These detectors, well-known in their own right, are of the impedance measurement type for example. Also, devices are connected preferably to each point of convergence of the lines, where these devices are used for deciding whether a fault is "upstream" or "downstream" from this point by orienting the lines with respect to this measurement point. Thus if two of these devices located at each end of a line and oriented to the line indicate a "downstream" fault, this fault is on the line. If these devices provide an "upstream" signal at one end, the fault is outside the line. These devices are known under the name of directional relays.

When such measurements have been made, the monitoring systems also incorporate protection devices which analyze the "fault" and which, depending on the results of these analyses, disconnect the line from its supply sources in order to protect these lines against any damage which might occur on the line and even result in its destruction, at least partially.

These devices are known by engineers familiar with this branch of engineering under the name of "protection relays".

Also, it must be noted that faults are not often transitory. In effect, if the fault was produced by a short-circuit caused by a foreign body, it is highly likely that this foreign body will maintain the short-circuit. Therefore, in this case, it is necessary to locate the fault, especially on long distance lines so that the specialized team nearest the fault can take remedial action as quickly as possible and repair the line. There are devices in parallel with the protection relays which, by analyzing the different signals collected from the line, are used for determining the distance between the fault and a measurement point. The latter devices are themselves known under the name of fault locator.

At present, there are devices which make it possible to give satisfactory results in most cases for the different aforementioned requirements.

On the other hand, at present, there is not a directional relay which gives satisfaction in the case of lines compensated with capacitors; and even the relays available now can give completely wrong results under certain conditions, by indicating an upstream fault when the actual fault is downstream. First of all it must be remembered that, in order to increase the powers passed along the lines, to improve the stability of the networks and to use long distance lines, the lines can be compensated. Such compensation is usually obtained by one or more sets of capacitors in series on the lines. Depending on the circumstances, these capacitors can be located at different points of the line. In any case, the overall compensation factor of the lines fitted with capacitors in this fashion, varies on average from 30 to 70%, which means that the total resultant impedance of the compensated lines is still predominantly inductive.

Having said this, and as indicated before, a line is still monitored from a point of a line, with respect to which this line is oriented. Viewed from this point, a line still presents a certain reactance which is, with a good approximation, proportional to the length of the line viewed from this point. When a fault occurs on this line, the distance between this fault and the measurement point will be a linear function of the reactance per unit length of this line. In the rest of the description, this total reactance of the portion of the line between the measurement point and the fault inclusive will be referred to as X.

Studying the value of this reactance X using different means makes it possible to determine whether a fault is downstream or upstream from the measurement point, with respect to which the value of the reactance X is taken. In all cases, the directional relays known up till now make it possible to define the position of a fault by taking this reactance X as the parameter for analysis, except when it contains reactance $X_c$ because of the capacitance value of a compensation capacitor.

The brief study of some examples of results provided by the directional relays known up till now proves that they still do not give coherent results in the case of lines compensated by capacitors.

Thus, if $X - X_c$ is positive and the actual fault is downstream, the fault seen is a virtual fault and is downstream, but much nearer the measurement point than the actual fault is in point of fact.

If $X - X_c$ is negative, but if $X_s + X - X_c$ is positive, with $X_s$ the total reactance upstream from the measurement point, the actual fault still being presumed downstream, a virtual fault is usually seen upstream from this measurement point under these conditions. This result which is the reverse of the actual condition would be given for example by a loop directional relay for a fault sensitive to the argument of the impedance measured using the voltage/current ratio. On the other hand, a directional relay, termed stored voltage or supplied with a safe voltage in the case of an asymmetric fault, would even give a downstream fault indication.

Finally, in the case where the two quantities $X - X_c$ and $X_s + X - X_c$ are both negative, the fault would be seen upstream regardless of whichever directional relays known up till now, for example such as distance measurement relays, loop impedance relays, total impedance relays or phase compensation relays, are employed.

In summary, as a fault can happen at any point in a line, it is impossible to know the value of the reactances involved and therefore to be able to decide with certainty whether a fault is upstream or downstream from a measurement point.

The aim of the present invention is to obtain a directional relay which makes it possible to provide acceptable results in the event of a fault on power transmission lines even if these lines are compensated by capacitors.

More particularly, the subject of the present invention is a method for monitoring at least one a.c. power transmission line and a directional relay which make it possible to determine with respect to said line when it is affected by a fault, whether said fault is upstream or downstream from a specific measurement point on said line. Such a relay includes first means for deriving a first signal which is a function of both the value of the complex voltage Um present on said line before the appearance of the fault and of the value of the complex line voltage U after appearance of said fault, second means for deriving a second signal which is a function of a characteristic magnitude measured on the line, and third means for combining said first signal with said second signal.

Figure 4:
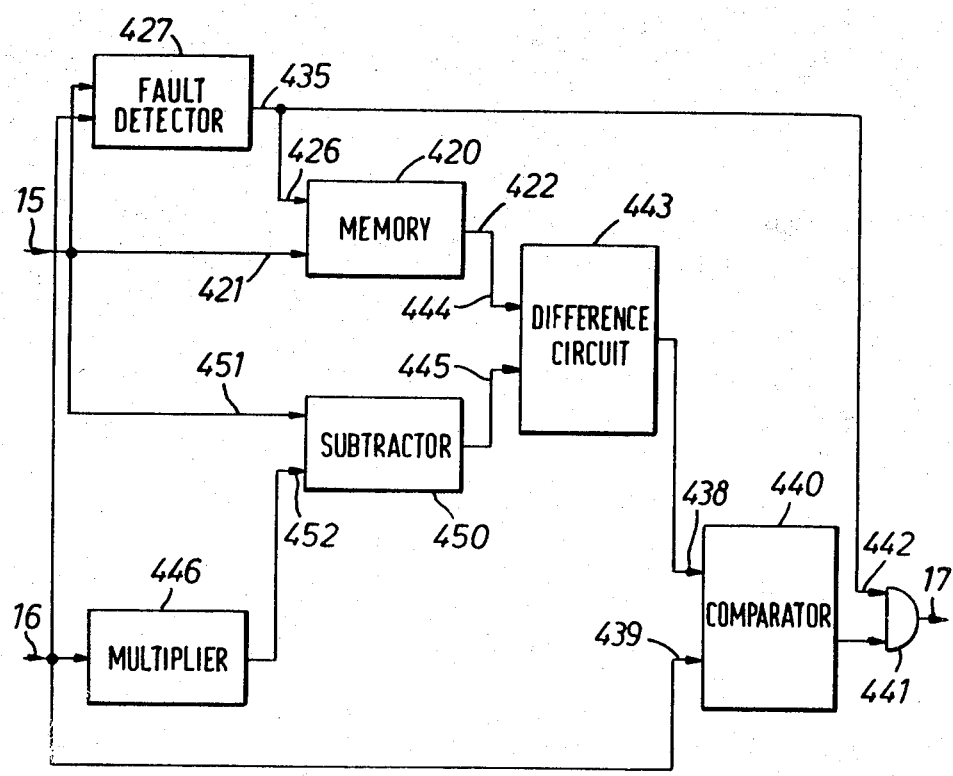
Figure 3:
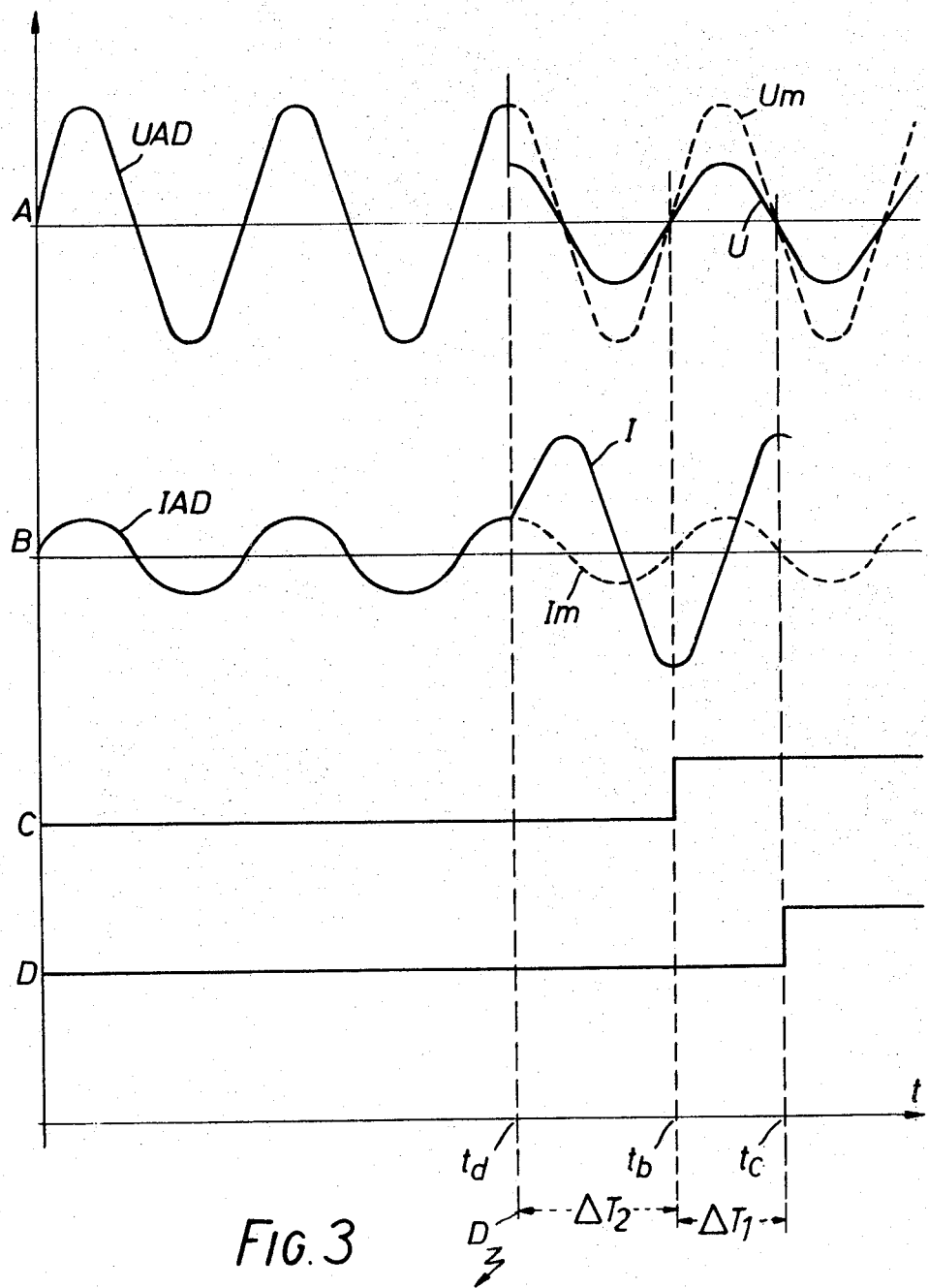
Figure 5:
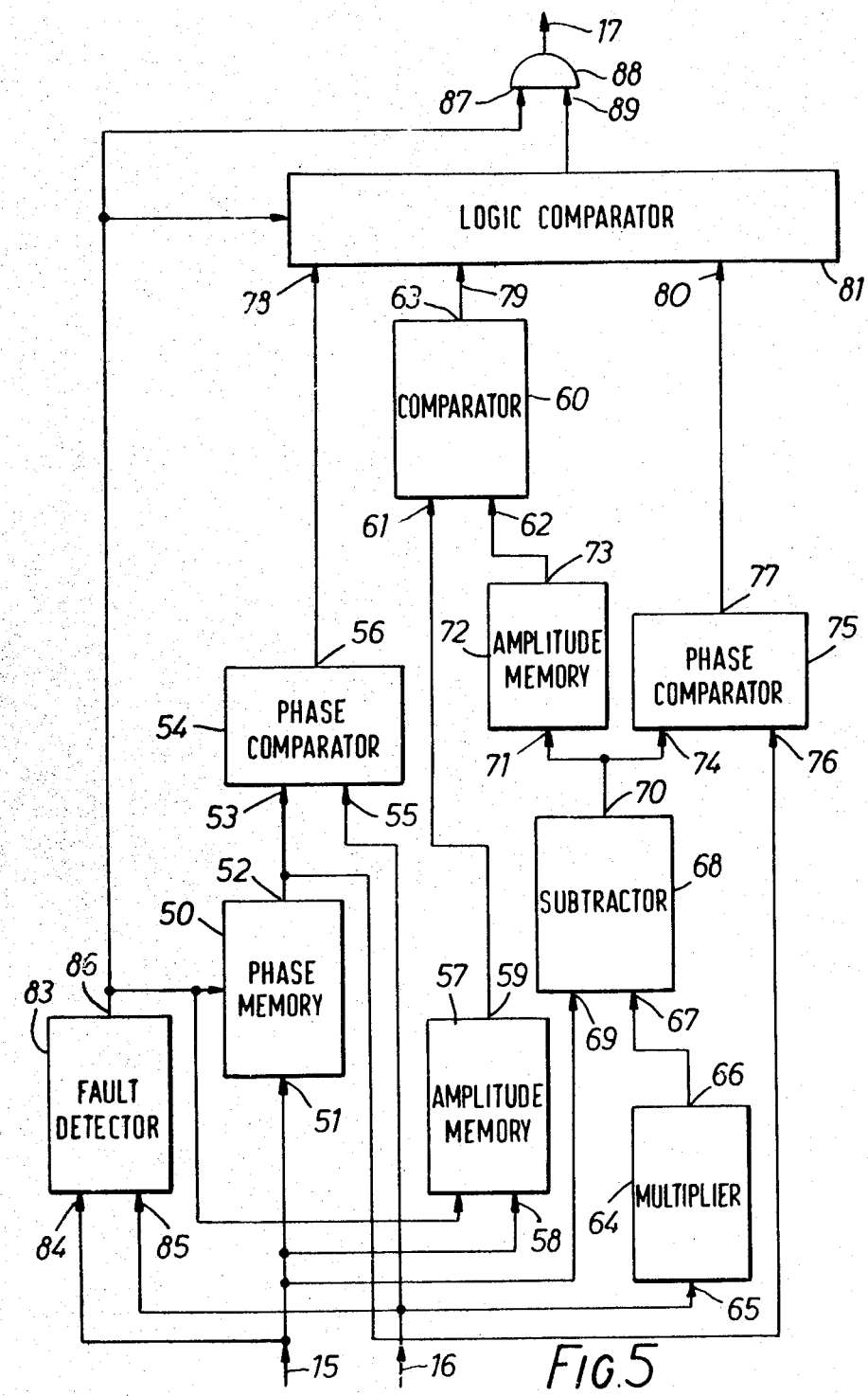

Other characteristics and advantages of the present invention will appear during the following description given with respect to the drawing appended by way of non-limitative example, in which:

FIG. 1 gives a schematic representation of a power transmission line taken from a network of lines, with the different parameters which make it possible to specify it electrically and to which a directional relay is connected, FIG. 2 is the block diagram for one embodiment of directional relay in accordance with the invention, FIG. 3 shows a series of graphs facilitating understanding the operation of the directional relay in accordance with the invention, FIG. 4 is a block diagram of another embodiment of a directional relay in accordance with the invention, FIG. 5 shows another example of an embodiment of a directional relay in accordance with the invention, and FIG. 6, A, B, gives an illustration of an example facilitating explaining the operation of the relay in accordance with FIG. 5.

Figure 7:
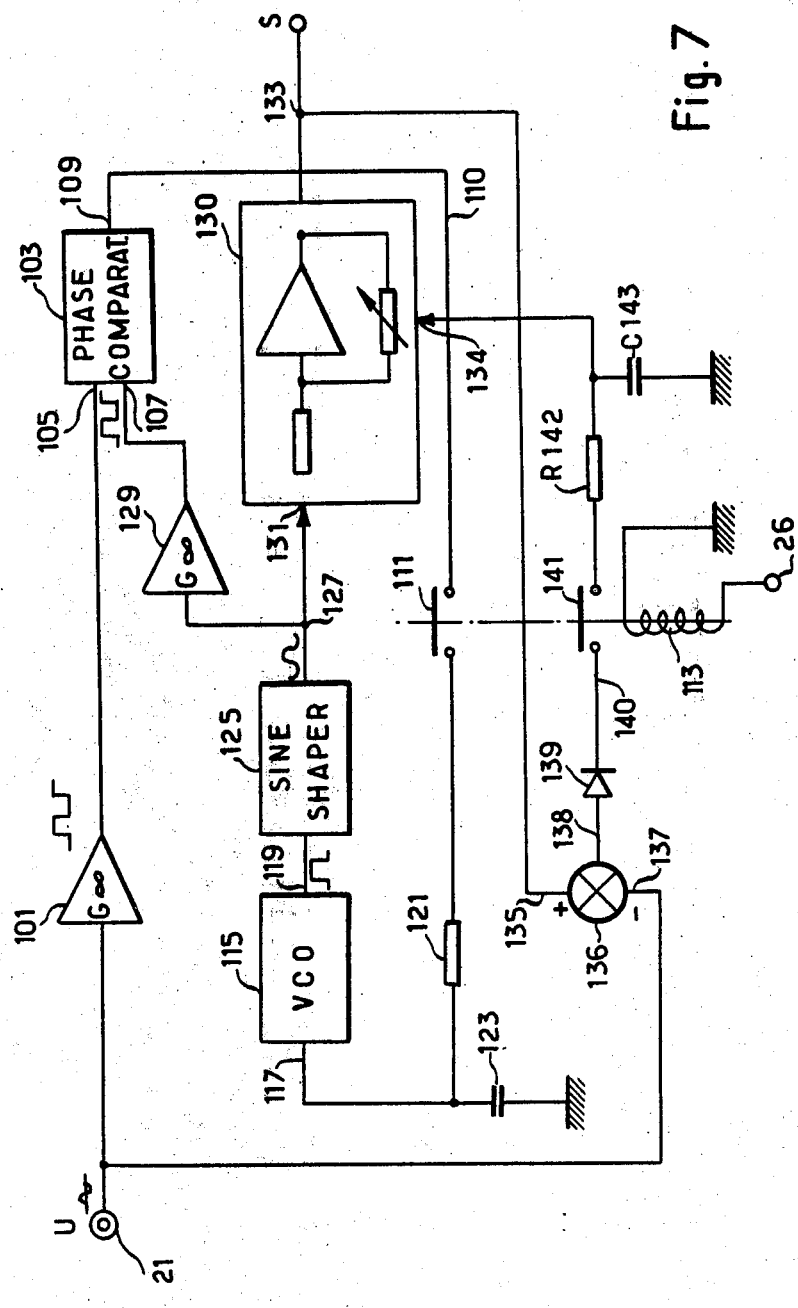

FIG. 7 shows an example of a complex voltage memory circuit.

FIG. 1 gives a very brief outline of a power distribution network. This network can comprise a multiplicity of lines which are interconnected with each other and fed from several supply sources.

In the example given in FIG. 1, the network comprises the first electrical power source 1 which marks off the first line 2. This line 2 is interconnected to a second line 3 via a connection point 4 which is physically formed by a set of bars. In this example, the line 3 can be supplied at its other end 5 by a second power source 6.

In the rest of the description, it will be assumed that the line to be monitored is that (3) included between point 4 and the source 6. This line will be oriented with respect to point 4, and thus a fault which occurs on this line 3 for example as that shown diagrammatically at 7 by a short-circuit flash 8, will be regarded as a fault downstream from point 4, and a fault which occurs on the section of the network 1, will be regarded as an upstream fault.

In a power supply network as shown diagrammatically in FIG. 1, the specialists in this field know the impedances of the lines with respect to a measurement point reasonably accurately. In the case of the network shown, the impedance of line 2 with respect to point 4 will be equal to $Z_A$ which denotes the upstream impedance and is shown diagrammatically on the figure at 9. The impedance of the line 3 will be split into two impedances, the first impedance Z included between the measurement point 4 and the fault point 7 shown diagrammatically at 10, and the second impedance $X_B$ included between the fault point 7 and the end 5 of the line 3, shown diagrammatically at 11.

As stated previously, monitoring a line in a complex network requires a certain number of instruments of which in particular a directional relay 12 which is that shown in FIG. 1 must determine whether a fault occurring somewhere within its set-up is upstream or downstream from the measurement point 4.

This directional relay 12 is connected to the sets of bars by transformers 13 and 14 of any kind which apply, to inputs 15 and 16, complex electrical signals usually in the form of voltage signals which are images of the line voltage and current which are taken from measurement point 4.

Transformers 13 and 14 can be of different construction as for example shunts or potentiometric resistances but which, because of the values of voltage and current to be measured, are formed by induction measurement transformers of the wound inductor type. When connected to point 4 of the network in this way, the directional relay 12 must provide a signal with two states at its output 17, where each state has to indicate, when a fault occurs in the network, if the fault is downstream or upstream from point 4.

FIG. 2 shows one embodiment of a directional relay in accordance with the invention, which makes it possible to resolve the problem of determining faults with respect to a point of origin in all types of a.c. power transmission network structures, whether these lines are compensated or not by capacitors.

The embodiment of the directional relay illustrated in FIG. 2 comprises an input terminal 15 which receives an electrical signal which is the image of the line voltage U. This terminal 15 is respectively connected to the input 21 of a memory 20 of which the output 22 is connected to the first input 23 of a difference circuit 24 of which the second input 25 is connected directly to the input terminal 15 to receive directly the representation of the line voltage U.

The memory 20 incorporates a control input 26 which, on the one hand, is used for isolating the memory 20 from its input 21 and for retaining the value of the signal preceding the control instruction, which was applied to its input, for a certain time in the memory. This time can be of any duration but preferably of about two to three cycles of the a.c. current flowing through the line to which input 15 is connected. As a design example, this memory can be formed by an oscillator which is amplitude and phase controlled and therefore frequency controlled, as shown in FIG. 7. In the latter case, the control signal applied to input 26 of the memory 20 disconnects the oscillator input which receives the voltage that is applied to input 15 and maintains the oscillations for the required time, as for example that given above.

The memory shown in FIG. 7 comprises a circuit 101 for squaring the sinusoidal obtained at the measurement point 4 and applied to the input terminal 21. The square wave signal produced by the circuit 101 is applied to one input 105 of a phase comparator 103 of which the other input 107 receives a square wave signal for comparison. The output 109 of the comparator 103 is connected to a control line 110 having a normally closed (conductive) contact 111 and operated to open by a relay 113 under the action of a control signal provided by the fault detector 27 (FIG. 2) received at the terminal 26. The control line 110 supplies the memory formed of a resistance 121 and a capacitor 123 which determine the control voltage applied to the input 117 of a voltage controlled oscillator (v.c.o.) 115. The square wave signal from vco 115 is transformed by a shaping circuit 125 which produces at its output 127 a sinusoidal voltage of which the frequency and the phase are determined by the oscillator 115. This voltage is applied to the input 131 of a variable gain amplifier 130 on the one hand, and after squaring by the circuit 129, to the input 107 of the phase comparator 103 on the other hand. This comparator 103 therefore ensures by means of the line 110 the maintenance of the sinusoidal voltage present at the output 127 in phase with and at the same frequency as the voltage received at the terminal 21.

The output 133 of the variable gain amplifier 130 is connected on the one hand to the output S connected to output 23 of the memory described and, on the other hand to one input 135 of an amplitude comparator 136 of which the other input 137 receives the input voltage on the terminal 21.

The output 138 of this amplitude comparator is connected by the diode 139 and the control line 140 to the memory R142, C143 which controls the gain control input 134 of the amplifier 130. A normally closed switch 141 controlled by the relay 113 is interposed on the voltage control line 140.

The signal present at S is normally controlled by the input voltage received by the terminal 21, in phase and frequency, on the one hand, by the line 110 and in amplitude, on the other hand, by the line 140.

If a fault occurs which provokes the energisation of the input 26, the relay causes the opening of the switches 111 and 141, thus interupting the two control chains of the signal at the output S. This signal continues to be delivered by the oscillator 115, the circuit 125 and the amplifier 130 with the frequency, the phase and the amplitude which the input voltage had at the moment of the fault.

The control signal for this memory 20 can be provided by a fault detector 27 which detects the presence of a fault in the network. This type of fault detection can be in accordance with that which the applicant markets under the designation PDS and which is known under the name of impedance measurement relay, which derives an output signal as a function of the value of the voltage and current of the line to which it is connected. The principle of this relay is described for example in report no. 3108 presented at the International Conference on Large High Voltage Electrical Systems (CIGRE), 112 Bd. Haussman, Paris during the session of 10–20 June 1968 by Messrs. L. Mouton and M. Souillard, and in U.S. Pat. No. 3,369,156.

The second input terminal 16 of the directional relay receives a voltage signal for example which is representative of the monitored line current. This input terminal 16 is connected to the first input 28 of a second memory 29 of which the output 30 is connected to the first input 31 of a second difference circuit 32. The second input 33 of this difference circuit 32 is connected directly to the second input terminal 16. The second memory 29 has the same function as the first memory 26 and can therefore be implemented in the same way. This is why its control input 34 is also connected to the output 35 of the detector 27.

According to a first embodiment closely related to that shown in FIG. 2, the two outputs 36 and 37 respectively from the two difference circuits 24 and 32 could be connected directly to both inputs 38 and 39 of a comparison unit 40 for the two signals which are supplied from the outputs from both these difference circuits. It will be explained later that this comparison unit can be formed by a phase comparator.

The output of this comparison unit 40 is connected to the output 17 of the directional relay via an enable circuit 41 of which the enable control input 42 is connected to the output 35 of the fault detector 27. For example, this circuit can be a logic gate which is closed as long as a signal is not supplied from the output 35 of the detector 27.

The operation of the system such as described above, by referring to the curves in FIG. 3, is as follows:

As long as the monitored section of the network is not affected by a fault, both memories 20 and 29 provide, at their output, signals which are absolutely identical to those obtained respectively at the inputs 25 and 33 to difference circuits 24 and 32 respectively. It therefore results from this that the outputs 36 and 37, from difference circuits 24 and 32 respectively, do not supply any signal. Moreover, as the fault detector has not detected any fault, the enable circuit is cut off and does not therefore supply any signal from 17.

On the other hand, when a fault occurs, the fault detector supplies a signal at its output which isolates both memories 20 and 29 which then supply at their output signals $U_m$ and $I_m$ (3A and 3B) respectively, which are identical as regards phase and amplitude as the signals $U_{AD}$ and $I_{AD}$, which were applied respectively to the inputs of the memories before the fault appeared. In FIG. 3, the graphs $U_m$ and $I_m$ are shown dotted and identical to those $U_{AD}$ and $I_{AD}$ which were applied before the fault which was assumed to happen at time $t_d$. The time of triggering the directional relay produced by the fault detector signal is defined by the time $t_C$ with a slight delay $\Delta T_I$ with respect to time $t_b$ for triggering the fault detector which also has a slight delay time $\Delta T_2$ with respect to time $t_d$ at which the fault actually happened. Nevertheless, the memories have an adequate time constant, for example 3 to 4 cycles of alternating current, to be kept in the state and provide both the required signals defined above.

So, after a relatively short interval of time, after the appearance of the fault, both difference circuits 24 and 32 provide continuously at their respective outputs complex signals representing the differences $U-U_m$ and $I-I_m$, where U and I are the voltage and current signals after appearance of the fault.

The comparator 40 which receives these two differences respectively at both its inputs compares the phases of both these differences (such comparators are well known, see for example CIGRE report no. 3108 mentioned earlier and French Pat. No. 1 477 510 filed Jan. 25, 1966). For example, this comparison can be carried out as follows: the difference in the phases of the signals $U-U_m$ and $I-I_m$ can be formed and this result can be compared with respect to a predetermined reference phase depending on the configuration of the network to be monitored. This last comparison can be done very simply by determining whether the phase of the difference of the two signals $U-U_m$ and $I-I_m$ is leading or lagging with respect to the reference phase. Each of these states will be represented by a different signal value at the output of the comparator respectively indicating whether the fault is upstream or downstream of the measurement point. It should be noted that comparison of the amplitudes of the signals $U-U_m$ and $I-I_m$ is not absolutely necessary in this method of implementation.

Finally, the signals (curve D, FIG. 3) obtained at the output of the phase comparator will be enabled via the enable circuit 41 which will be opened by the signal supplied by the fault detector 27 (curve C, FIG. 3).

Only the phase parameters of complex quantities of $U-U_m$ and $I-I_m$ are required in this embodiment. On the other hand, the amplitude can nevertheless affect the sensitivity of such a directional relay. In some cases where the amplitude is too low it is worthwhile taking action on the magnitude of the amplitudes of these complex quantities $U-U_m$ and $I_u-I_m$ to be compared, in order to remove the limit conditions called "DEAD ZONE", as explained for example in U.S. Pat. No. 3,651,377 issued Mar. 21, 1972).

For this reason, in the embodiment actually shown in FIG. 2, the directional relay additionally comprises, inserted between the output 36 and the input 38 of the comparator, a difference circuit 43 which receives at its first input 44 the difference $U-U_m$ and at its second input 45 the signal supplied from the output 37 of the difference circuit 32 via an impedance multiplier 46 which multiplies the difference $I-I_m$ with a compensation impedance $Z_c$ which can be a reactance or a mutual inductance, i.e. two windings coupled by a soft iron core.

Of course, the output 37 of the memory 32 is still connected to the input 39 of the comparator. So, in this embodiment, the comparator operates in the same way as described previously but it compares the phases of the signal $U-U_m-Z_c(I-I_m)$ and of the signal $I-I_m$.

The choice of the compensation impedance can be important for obtaining sufficient sensitivity and good selectivity at the same time.

The applicant has established that, preferably, this compensation impedance $Z_c$ ought to be within two limits $Z_c$ min. and $Z_c$ max. inclusive.

For the first limit, $Z_c$ min. multiplied by $I-I_m$ must give an adequate voltage for the sensitivity of the comparator, particularly as regards phase.

The second limit value, $Z_c$ max. must be less than the line impedance $Z_L$ downstream from the measurement point. This line impedance $Z_L$ is known and constant. In this case, it will be possible for $Z_c$ to be equal to half of this line impedance $Z_L$, in order to obtain both a good sensitivity in the event of a downstream fault and a good safety margin for an upstream fault, even under the worst case fault conditions i.e. in the event of an upstream fault near to the measurement point or even in the case of a downstream fault at the end of the line furthest from the measurement point.

In order to have a good guarantee of selectivity in the event of a fault upstream from the measurement point 4, it is essential that the compensation impedance $Z_c$ is always much less than the total impedance of the line plus the source impedance between point 4 and point 6 inclusive. If the source connected to the far end of the line is very powerful, its impedance becomes negligible compared with that of the line and the total impedance is reduced to that of the line $Z_L$. If the line can be compensated by a series capacitor its resultant impedance $Z_{LC}$ will be reduced and lower than $Z_L$ since:

$$Z_{LC}=R_L+jX_L-jX_C$$

where $X_L$ and $X_C$ are respectively the reactance of the line and the capacitance of the capacitor at the fundamental frequency of the network. Therefore usually a value of $Z_C$ will be selected that is very close to $\frac{1}{2}Z_{LC}$ even in this case.

The phase comparator 40 forms a difference of the phases of the signals $U-U_m$ and $I-I_m$. It is recalled that faults on the lines can take place between phases or even between phases and earth for example. Therefore all these fault conditions must be considered and so, at a measurement point, several directional relays will be fitted which will monitor the various fault possibilities, either between phases, or between phases and earth.

Usually, for faults between phases, experience shows that the amplitude of the fault current is very large compared with that of the line current without a fault, i.e. the load current.

Under these conditions, the embodiment of the directional relay in accordance with the invention can comprise a phase comparator which compares the phase of the signal $U-U_m$ obtained at the output of the memory with the phase of the current I after the fault is established.

So, the directional relay can be implemented without needing a memory of the load current as the memory 29 of the implementation in accordance with FIG. 2.

FIG. 4 shows such an embodiment with compensation by a local impedance such as the impedance $Z_C$. The directional relay in accordance with FIG. 4 comprises a memory 420 connected by its first input 421 to the input terminal 15. The output 422 of this memory 420 is connected to the first input 444 of a difference circuit 443. The second input 445 of this difference circuit 443 is connected to the output of a subtraction circuit 450. This subtraction circuit 450 has two inputs 451 and 452 which receive respectively on the one hand the voltage applied to the input 15 and on the other hand a voltage proportional to the current I supplied by a multiplier 446 fed with a signal representing the value of the current I, where this voltage supplied by this multiplier is equal to the value of I multiplied by the value of a compensation impedance $Z_C$ as defined previously.

The relay also comprises, as in the embodiment described previously, a comparator 440 of which the inputs 438 and 439 are respectively connected to the output of the difference circuits 443 and to the input 16, and also, a fault detector 427 of which the output 435 is connected to the control input 426 of the memory 430 and the control input 442 of an enable circuit 441 of which the output forms the output 17 of the directional relay.

The operation of this relay shown in this FIG. 4 is deduced from that shown in FIG. 2.

However, this embodiment in its application to the monitoring between phases, for example, can be of a simpler design especially as regards the structure of the pre-fault voltage memory. In fact, in this mode of monitoring, a simple phase memory, without an amplitude memory, can be used, i.e. a memory which provides pulses in phase with that of the voltage will be sufficient, without the amplitude of these pulses affecting the results obtained.

In conventional networks, the impedances are mainly reactive, inductive or capacitive. It follows that the voltages U, $Z_CI$, $U_m$ and $(U-Z_CI)-U_m$ can still be taken in all cases as in phase or in quadrature with the vector representing the current I.

Under these conditions, the signals which are usable in processing the signals through the directional relays can be two-state logic signals.

FIG. 5 gives an example of an embodiment of a directional relay which can be used under the aforementioned conditions.

First of all, for simplifying the description, the signal $U-Z_CI$ will be taken as equal to $U_C$.

The directional relay shown in FIG. 5 comprises a phase memory 50 of which the input terminal 51 is connected to the terminal 15 to which is applied the image signal of the line voltage, which provides at its output 52 a phase signal $U_m\phi$. A possible implementation of such a phase memory is described in report no. 3402, pages 8 and 9, presented by Messrs. Souillard, Sarquiz and Mouton at the CIGRE Conference "International Conference on Large High Voltage Electrical Systems", 112 Bd. Haussman, 75008 Paris, from 21 to 29 Aug. 1974. The output 52 is connected to the first input 53 of a phase comparator 54 of which the second input 55 is connected to the input terminal 16 of the relay to which is applied an image signal on the line current. This comparator provides at its output 56 a logic signal $C_p$ which can be in a logical "1" state when the voltage has a phase lead of 90° with respect to the current and in a logical "0" state when it has a phase delay of 90°.

The relay also comprises an amplitude memory 57 of which the input 58 is connected to the input terminal 15. This amplitude memory, for example an analogue or digital peak detector, provides at its output 59 a signal representing the absolute value of $U_m$, i.e. the modulus of the pre-fault line voltage $U_m$. The output 59 is connected to the input 61 of an amplitude comparator 60 for comparing the value $U_m$ with the value representing the amplitude of the voltage $U_c$ i.e. $|U-Z_C|$. The symbol $|\ |$ is used to represent amplitude.

The signal representing $U_C$ is applied to the input 62 of this comparator 60. The output 63 of this comparator provides a signal $C_M$ which represents the difference $U_C - U_m$ and which can take two logical states, i.e. logical "1" state when the amplitude of $U_C$ is greater than the amplitude of $U_m$ and logical "0" state in the opposite case.

In order to derive the signals representing $U_C$ and $|U_C|$ the directional relay comprises a multiplier 64 of which the input 65 is connected to terminal 16 which receives the signal which is an image of the line current, in order to obtain at its output a signal representing the product of I by a local compensation impedance $Z_C$ included in the multiplier. The output 66 of this multiplier 64 provides a signal representing $IZ_C$ which is applied to the input 67 of a subtraction circuit 68 of which the other input 69 is connected to terminal 15. So, the output 70 of this subtraction circuit provides a signal representing the difference $U-Z_CI$ i.e. $U_C$. This output 70 feeds the input 71 of an amplitude memory 72 which provides at its output 73 a signal representing the value of the amplitude of $U_C$ i.e. $|U_C|$ or $|U-Z_CI|$ for feeding the input 62 of the amplitude comparator 60.

Also, the output 70 of the subtraction circuit 68 is also connected to the first input 74 of a phase comparator 75 of which the other input 76 is connected to the output 52 of the phase memory 50. The output 77 of this phase comparator provides a logic signal $C_{cm}$ which can take two states, the logical "1" state when both signals $U_C$ and $U_m$ are in phase, or the logical "0" state if both signals are in phase opposition.

Thus, the three outputs 56, 63 and 77 provide the signals $C_P$, $C_M$ and $C_{cm}$ which are connected respectively to the three inputs 78, 79 and 80 of a logic comparator 81 that provides a signal $C_D$ at its output 82.

This comparator 81 compares the three signals $C_D$, $C_M$ and $C_{cm}$ by applying the following operations:

$$C_P(\overline{C_{cm} \cdot C_M}) + \overline{C_P}(C_{cm} \cdot C_M) = C_D \qquad (I)$$

Conventional logic notation is used with the following meanings:

$\overline{X}$ = inverse of signal X
$X \cdot Y = X$ AND $Y$
$X + Y = X$ OR $Y$

This example of an embodiment of a directional relay comprises the phase comparator 75 which compares the phase of the signals representing $U_C$ and $U_m\phi$. However, as mentioned previously, both these signals are in phase or in phase opposition, but are still in quadrature with the signal representing the current I. Then in this case, the comparator could also be a phase comparator between the signals representing $U_C$ and I and then the signal $C_{CM}$ would be equal to $(C_P\, C_{CI} + \overline{C_P}\, \overline{C_{CI}})$ with $C_{CI}$ the signal which would be obtained at the output of the phase comparator between $U_C$ and I, which takes the value 1 when $U_c$ is leading I and the value 0 in the opposite case. Therefore in the latter case, the logic comparator 81 would compare the signals $C_P$, $C_{CM}$ and $C_{CI}$ by applying the equation:

$$C_P(C_P C_{CI} + \overline{C_P C_{CI}})C_M + \overline{C_P(C_P C_{CI} + \overline{C_P \cdot C_{CI}})}C_M = C_C \qquad (II)$$

FIG. 6 with both sections A and B gives a concrete example of a fault D downstream with respect to a point P on a line compensated by a capacitor $\gamma$ and which presents an impedance $Z_s$. Because of the presence of the capacitor $\gamma$ the voltage at point A presents an overvoltage, which results in the amplitude of $U_C$ being greater than the amplitude of $U_m$, but on the other hand, both voltages are in phase and 90° lagging with respect to the current vector, the different vectors $U_C$, $U_m$ and I are shown in FIG. 6B. Under the aforementioned conditions, the signals $C_P$, $C_M$ and $C_{cm}$ will then have their respective logical values "0", "1" and "1". Substituting these in the comparison equation (I) will give the result:

$$C_D = 0 \cdot (\overline{1 \cdot 1}) + 1(1 \cdot 1) = 1$$

Finally, as $C_D$ has the logical value "1", this determines the presence of a fault downstream from point P, whereas all the other directional relays recognized up till now would surely have indicated an upstream fault in this fault condition.

Of course, a fault detector 83 must be associated with this directional relay in accordance with FIG. 5, where this fault detector is fed via its two inputs 84 and 85 respectively with signals representing U and I, and providing at its output 86 a signal confirming the presence of a fault on the grid. This output is connected, for example according to the adapted technique, to the control inputs of the memory 50 of the modulus memory 57 of the comparison unit 81 and to the second input 87 of a logic enable circuit 88 of which the second input 89 is connected to the output 82 of the comparator 81.

All the embodiments of directional relays which have been described hereinabove obtain good results in all the types of line to be monitored, but above all they resolve the problems which were posed for monitoring lines compensated with capacitors. In fact, they constitute relays which provide correct directional signals in the case of compensated lines even when the capacitor is positioned at the beginning of the line.

In effect, these embodiments can resolve these problems because they measure only the impedance which is upstream with respect to the fault and at the measurement point and since this upstream impedance is formed by healthy parts of the network, i.e. not affected by a fault, and since it is still predominantly inductive even when it incorporates a compensation capacitor, because as mentioned already, the compensation factor does not usually exceed 70%.

By referring to FIGS. 1 and 3, the results obtained can be explained as detailed hereinafter:

First of all, for clarifying the proof, it is defined that:

$V_D$ is the voltage at the fault point 7 before the fault,
$U_m$ is the voltage at point 4 before the fault,
U is the voltage at point 4 when the grid is affected by a fault,
$I_m$ is the load current of the line before the fault,
$J_D$ is the actual current through the fault 8,
$I_D$ is the fault current component "viewed" at the measurement point 4,
$Z_D$ is the resultant impedance of the grid viewed from the fault point 7;
$R_D$ is the resistance of the fault 8,
$Z_A$ is the upstream impedance at point 4,
Z is the impedance of the line between points 4 and 7, and
$Z_B$ is the inclusive impedance between point 7 and the end 5 of the line 3.

The total current I viewed at point 4 after the fault is equal to:

$$I_D + I_m = I \qquad (III)$$

The fundamental equations in the lines are:

$$J_D = \frac{V_D}{Z_D + R_D} \qquad (IV)$$

$$Z_D = \frac{(Z_A + Z) Z_B}{Z_A + Z + Z_B} \qquad (V)$$

and :

$$I_D = J_D \frac{Z_B}{Z_A + Z + Z_B} = \frac{V_D}{Z_D + R_D} \cdot \frac{Z_B}{Z_A + Z + Z_B} \qquad (VI)$$

$$U_m = V_D + ZI_m = J_D(Z_D + R_D) + ZI_m \qquad (VII)$$

and :

$$U = IZ + J_D R_D = (I_D + I_m) Z + J_D R_D \qquad (VIII)$$

These different embodiments which have been described come back to studying the ratio:

$$\frac{U - U_m}{I - I_m}$$

particularly in the comparators and more particularly the phases.

So, when a fault occurs downstream from the measurement point 4 of the preceding equations, the difference $U - U_m$ is equal to $I_D Z - J_D Z_D$.

Consequently, the ratio:

$$\frac{U - U_m}{I - I_m} = \frac{U - U_m}{I_D} = Z - \frac{J_D}{I_D} Z_D$$

but, by taking into account equations (V) and (VI), $$Z - \frac{J_D}{I_D} Z_D$$

is equal to:

$$Z - \frac{Z_A + Z + Z_B}{Z_B} \cdot \frac{(Z_A + Z) Z_B}{Z_A + Z + Z_B}$$

which means that:

$$\frac{U - U_m}{I - I_m} = Z - (Z_A + Z) = -Z_A$$

i.e. that this ratio is equal to a negative value of the impedance upstream from point 4.

On the other hand, in the case of an upstream fault, the ratio $$\frac{U - U_m}{I - I_m}$$

by a similar calculation shows that it is equal to $Z + Z_B$ i.e. in fact the impedance downstream from the measurement point.

In conclusion, given that in the case of a downstream fault the result of the ratio gives the negative value of the upstream impedance and in that of the upstream fault the value of the downstream impedance, and that these impedances are always known for the lines to be monitored, it is sufficient to compare the phases of these complex ratios with respect to a predetermined reference phase in order to distinguish between an upstream fault and a down-stream fault.

As explained above Im can often be considered small in relation to I and can be neglected. Also U can be replaced by $Uc = U - ZcI$ to eliminate the "Dead Zone" cases such that the detection of the direction of the fault is reduced to a comparison of the phases Uc−Um and I. If Uc−Um is leading the current I, the complex relationship Uc−Um/I is positive and the fault is upstream of the measurement point 4. If Uc−Um is lagging the current I, the relationship Uc−Um/I is negative and the fault is downstream.

In the case of purely reactive impedances, it is verified, for example with the help of graphs of the type shown in FIG. 6B that this phase comparison can be effected by combining the lagging signals such as Cp, $C_M$ and Ccm according to logic equation (1) above to obtain a value of CD=1 indicating a downstream fault if Uc−Um is lagging the current I (case of FIG. 6B) and a value CD=0, indicating an upstream fault, in the positive case.

An outstanding property of directional relays in accordance with the invention is the complete elimination of the effect of the load current and of the fault resistance which could change the quality of the directional detection conventional directional relays known up till now.

It must also be stated that these directional relays in accordance with the invention can also be applied to a 3-phase system. Then these relays receive respectively the quantities U, $U_m$: I, $I_m$ in all homologous combinations of voltages and currents, such as:

| Phase quantities : | Earth single |

| | | |
|---|---|---|
| | -continued | |
| | phase voltage | Uam |
| | phase current | Ia |
| Quantities between phases: | | |
| | voltage between phases | Uab |
| | compound current | (Ia-Ib) |
| Positive phase sequence component quantities: | positive phase sequence component of voltages | Ud |
| | positive phase sequence component of currents | Id | or even any other homologous combinations of voltages and currents of quantities of phases or symmetrical, positive, negative and zero-phase sequence components.

Finally, the embodiments described have been given by way of non-limitative example and can equally well use analogue measurement facilities and "memory" circuits achieved using slave oscillators, and also digital sampling measurement facilities; then the "memories" would be obtained by the equivalent of a delay line by using a shift register of the digital values of the voltage and current samples preceding the appearance of the fault.

I claim:

1. A method for determining the direction of a fault on an A.C. electrical power transmission line with respect to a measurement point located on said line, comprising the steps of: producing a first signal which is a function of a value of the complex voltage U at the measurement point after the appearance of the fault; producing a second signal which is a function of a value of the complex voltage $U_m$ at the measurement point before the appearance of the fault; combining the first signal with the second signal to obtain a third signal which is a function of U and $U_m$; and obtaining an indication of the direction of the fault with respect to the measurement point as a function of said third signal.

2. A method according to claim 1, wherein said combining step includes forming a function of the difference between the complex voltages U and $U_m$.

3. A method according to either of claims 1 and 2, further comprising the step of producing a fourth signal which is a function of the value of the complex current I at the measurement point after the appearance of the fault, and wherein said obtaining step includes combining the third and fourth signals to obtain an indication of the direction of the fault.

4. A method according to claim 3, wherein said fourth signal is a function of the difference between the values of the complex line current at the measurement point after the appearance of the fault and before the appearance of the fault.

5. A method according to claim 3, wherein the third signal is also a function of a value of the complex current at the measurement point.

6. A directional relay for monitoring at least one A.C. electrical power transmission line to determine whether a fault affecting the line is upstream or downstream of a measurement point located on said line, comprising: first means for producing a first signal which is a function of both a value of the complex line voltage U at the measurement point after the appearance of the fault and a value of the complex line voltage U at the measurement point before the appearance of the fault, second means for producing a second signal which is a function of a characteristic parameter measured on the line, and third means for combining the first and second signals to produce an indication of the direction of the fault with respect to the measurement point.

7. A relay according to claim 6, wherein the first signal is a function of the difference between the complex voltages U and $U_m$.

8. A relay according to claim 6, wherein said characteristic parameter is the value of the complex current I at the measurement point after the appearance of the fault.

9. A relay according to claim 6, wherein the second signal is a function of the difference between the values of the complex currents I and $I_m$ in the line at the measurement point after and before the appearance of the fault respectively.

10. A relay according to claim 8, wherein the first signal is also a function of a value of the complex current at the measurement point.

11. A relay according to claim 6, wherein the first means comprise a circuit for forming a compensation term in response to the value of the complex current I after the appearance of the fault and means for producing a signal which is a function of this compensation term and the values U and $U_m$ of the complex voltage.

12. A relay according to claim 11, wherein the compensation circuit comprises a multiplier for multiplying the current I by an impedance $Z_c$ which is less than the impedance $Z_L$ of the line.

13. A relay according to any one of claims 6 to 12, wherein the first means comprise a first memory for the complex voltage $U_m$ before the appearance of the fault and a circuit for forming at least one characteristic parameter which is a function of the complex difference between the voltages U and $U_m$.

14. A relay according to any of claims 6 to 8, wherein the second means comprise a second memory for the complex current $I_m$ before the appearance of the fault and a circuit for forming at least one characteristic parameter which is a function of the complex difference between the currents I and $I_m$.

15. A relay according to any of claims 6 to 12, wherein the third means comprise a phase comparator for the first and second signals.

16. A relay according to any of claims 6 to 12, wherein the first means comprise a phase memory for the voltage $U_m$ and an amplitude memory for this same voltage.

17. A relay according to claim 16, wherein the first means additionally comprise means for producing a signal resulting from the comparison of the phases of functions of $U_m$ and U, and means for providing a signal resulting from the comparison of the amplitudes of functions of U and $U_m$.

18. A relay according to claim 17, wherein the means for providing the signals resulting from the phase and amplitude comparisons are adapted to provide a signal resulting from the respective comparisons of the phases and amplitudes of $U_m$ and of a value of U compensated by a term which is a function of I.

19. A relay according to claim 17 wherein the means for producing a signal resulting from the phase comparison comprises means for comparing the phase of a function of the voltage U and the phase of the current I, in the case where this latter is related to the phase of $U_m$ by a known relationship.

20. A relay according to claim 6, wherein the first means comprise means for producing a first binary signal $C_m$ in response to a comparison of amplitudes which are functions of the voltages U and $U_m$, and means for producing a second binary signal $C_{cm}$ in response to a comparison of phases functionally related to the phases of U and $U_m$, and the second means comprise means for producing a third binary signal $C_p$ which is a function of the current I, the third means including means for combining said first, second and third binary signals to produce an indication of the direction of the fault.

21. A relay according to claim 20, wherein the third binary signal $C_p$ is the result of a comparison of the phases of the current I and the voltage $U_m$.

22. A relay according to claim 21, wherein the third means are adapted to combine the first, second and third binary signals to produce a signal $C_D$ in accordance with the formula $$C_p \overline{(C_m \cdot CM)} + \overline{C_p} (C_{cm} \cdot CM) = C_D$$

where $C_D$ indicates whether the fault is downstream or upstream of the measurement point.

23. A relay according to any of claims 6 to 12 or 20 to 22 additionally comprising at least one validation circuit for the signals supplied by said means, said validation circuit having at least one input coupled to a fault detector.

24. A directional relay for monitoring an A.C. electrical power transmission line to determine, when said line is affected by a fault, whether said fault is upstream or downstream of a measurement point positioned on said line, comprising: first means for producing a first complex signal which is a function of the difference between a value representative of the complex voltage U of said line after the appearance of said fault and a value representative of the complex voltage $U_m$ of the line before the appearance of the fault, second means for producing a second complex signal substantially representative of the complex current I of the line after the appearance of said fault and third means for comparing at least one of the characteristic parameters of said first complex signal with one of the corresponding parameters of the second complex signal to provide a signal indicating the direction of the fault with respect to the measurement point.

25. A method for determining the direction of a fault on an oriented alternating power transmission line with respect to a measurement location comprising the steps of:
deriving a first signal representative of a complex voltage value U at the measurement location after the occurrence of a fault;
deriving a second signal representative of a complex voltage value $U_m$ at the measurement location before the occurrence of said fault;
deriving a third signal representative of a complex current value I in the line at the measurement location after the occurrence of said fault; and combining said first, second and third signals to produce a fourth signal which provides an indication of the direction of said fault with respect to the measurement location on the oriented power line.

26. A power transmission line monitoring apparatus for determining the direction of a fault on an oriented alternating power transmission line with respect to a measurement location comprising:
first means for producing a first signal functionally related to the difference between values U and Um of complex voltage at the measurement location after and before the occurrence of a fault, respectively;
second means for producing a second signal functionally related to a value of complex current in the line at the measurement location; and third means responsive to said first and second signals for producing a third signal which provides an indication of the direction of the fault with respect to the measurement location on the oriented line.

27. The apparatus of claim 26, wherein said second signal is functionally related to the value I of complex current in the line at the measurement location after the occurrence of said fault.

28. The apparatus of claim 26, wherein said second signal is functionally related to the difference between values I and Im of complex current in the line at the measurement location respectively after and before the occurrence of the fault.

29. The apparatus of claim 26, wherein said first means comprises memory means for storing a representation of said complex voltage Um and means for deriving a function of the difference between said stored representation and a representation of the complex voltage U.

30. The apparatus of claim 26, wherein said first means comprises means for subtracting respective values of a characteristic parameter of the complex voltages U and Um.

31. The apparatus of claim 30, wherein said characteristic parameter is the phase of the complex voltages.

32. The apparatus of claim 30, wherein said characteristic parameter is the amplitude of the complex voltages.

33. A power transmission line monitoring apparatus for determining the direction of a fault on an oriented alternating power transmission line with respect to a measurement location thereon, comprising:
means for producing a first signal functionally related to values U and Um of complex voltage at the measurement location respectively after and before the occurrence of a fault;
means for producing a second signal functionally related to a value I of complex current in the line at the measurement location after the occurrence of said fault; and
means for combining characteristic parameters of said first and second signals to produce a third signal which provides an indication of the direction of the fault with respect to the measurement location on the oriented line.

34. The apparatus of claim 33, wherein the means for producing said first signal comprises memory means for storing a representation value of said complex voltage Um.

35. The apparatus of claim 33, wherein the means for producing said first signal comprises memory means for storing a representation of the phase of said complex voltage Um and means for storing a representation of the amplitude of said complex voltage Um.

36. The apparatus of claim 33, wherein the characteristic parameter combined is the phase of the first and second signals.

37. A power transmission line monitoring apparatus for determining the direction of a fault on an oriented alternating power transmission line with respect to a measurement location thereon, comprising:
first means for deriving a first signal functionally related to a value U of complex voltage at the measurement location after the occurrence of a fault;

second means for deriving a second signal functionally related to a value Um of complex voltage at the measurement location before the occurrence of said fault;

third means for deriving a third signal functionally related to a value I of complex current in the line at the measurement location after the occurrence of said fault and;

fourth means for combining said first, second and third signals to provide an indication of the direction of said fault with respect to the measurement location on the oriented power line.

38. The apparatus of claim 33, wherein said fourth means comprises:

means for producing a fourth signal related to the phase relationship between Um and I;

means for producing a fifth signal related to the amplitude relationship of U and Um;

means for producing a sixth signal related to the phase relationship of U and Um, and, means for combining said fourth, fifth and sixth signals for providing said fault direction indication.

39. A power transmission line monitoring apparatus for determining the direction of a fault on an oriented alternating power transmission line with respect to a measurement location thereon, comprising:

first means for deriving a first signal related to the amplitude relationship of values U and Um of voltage at the measurement location after and before the occurrence of a fault respectively;

second means for deriving a second signal functionally related to the phase of U with respect to a reference;

third means for deriving a third signal functionally related the phase of Um with respect to the reference, and fourth means for combining said first, second and third signals to provide an indication of the direction of the fault with respect to the measurement location.

40. The apparatus of claim 39, wherein said first signal is representative of the amplitude relationship between the amplitude of a compensated value of U and the amplitude of Um.

* * * * *